(143.)
CHARLES WIGGERS.
Improvement in Toys.
No. 122,875.   Patented Jan. 16, 1872.
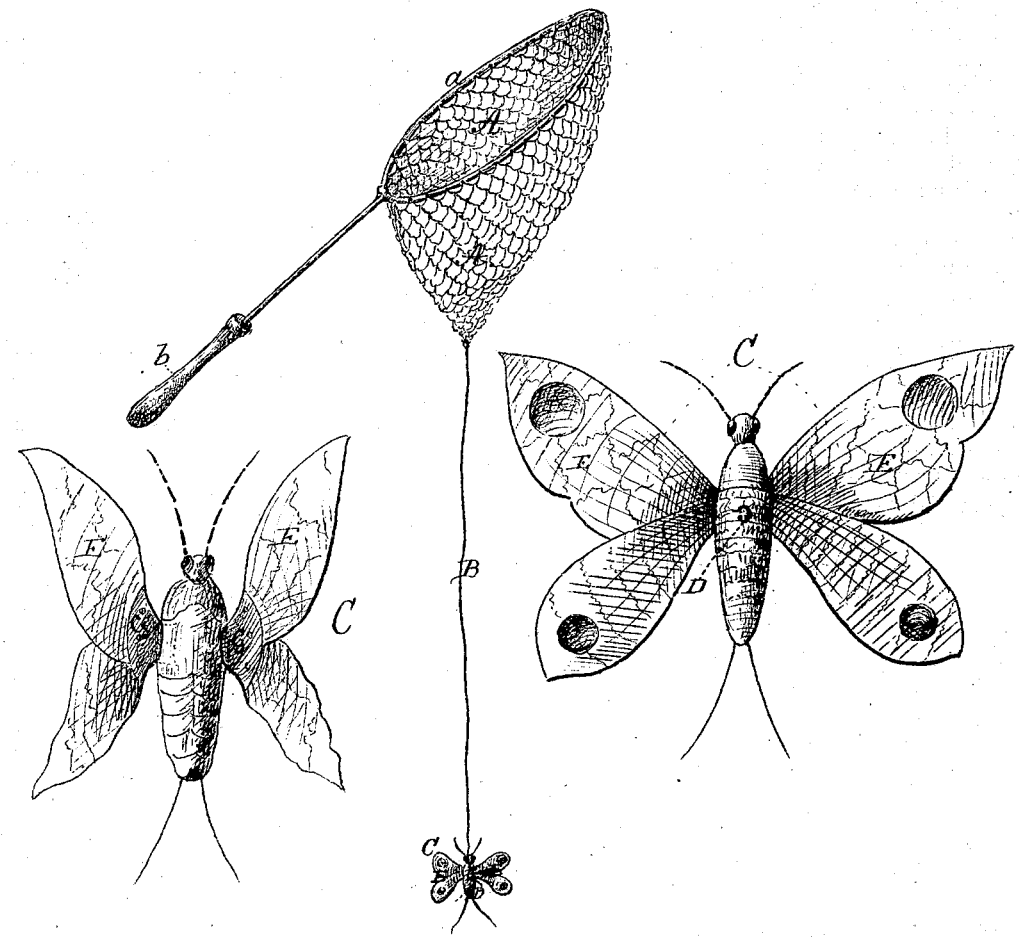
WITNESSES:   INVENTOR:

UNITED STATES PATENT OFFICE.

CHARLES WIGGERS, OF CINCINNATI, OHIO.

IMPROVEMENT IN TOYS.

Specification forming part of Letters Patent No. 122,875, dated January 16, 1872.

*To all whom it may concern:*

Be it known that I, CHARLES WIGGERS, of Cincinnati, in the county of Hamilton and State of Ohio, have invented a certain new and Improved Toy for the amusement, exercise, and instruction of children, which I denominate "The Little Naturalist's Net," the following being a full and complete description of the same, reference being had to accompanying drawing.

A represents a conical net attached to a hoop, $a$, having a handle, $b$. B represents an elastic cord attached to the apex of the net A and to the back of the butterfly C by a hook or ring, D. C represents an automaton butterfly, the body of which I make of metal or other heavy material, and to which I attach wings E made of paper, feathers, or other light material, by hinges or joints G, so arranged that they will rise to a perpendicular and fall to a horizontal position when the toy is being operated.

By taking hold of the net by the handle, and suddenly raising it up and down so as to communicate a perpendicular motion to the butterfly through the cord B, the wings E will flap like those of a butterfly in the act of flying; then, by an adroit turn of the net, the operator can catch the butterfly in its toils, thus imitating the manner in which naturalists catch living butterflies.

Birds and insects also are considered by me an equivalent for the butterfly shown.

Claim.

I claim as my invention—

The combination of the net A, the elastic cord B, and the automaton butterfly C, as and for the purpose hereinbefore set forth.

CHARLES WIGGERS.

Witnesses:
RUDOLPH BRUNS,
CHRISTIAN LÜDEKE. (143)